(12) United States Patent
Todalshaug (10) Patent No.: US 10,082,127 B2
(45) Date of Patent: Sep. 25, 2018

(54) WAVE ENERGY CONVERTER WITH NEGATIVE SPRING

(71) Applicant: Norwegian University of Science and Technology, Trondheim (NO)

(72) Inventor: Jørgen Hals Todalshaug, Nesoddtangen (NO)

(73) Assignee: Norweigian University of Science and Technology, Trondheim (NO)

( * ) Notice: Subject to any disclaimer, the term of this patent is extended or adjusted under 35 U.S.C. 154(b) by 174 days.

(21) Appl. No.: 15/111,659

(22) PCT Filed: Jan. 16, 2015

(86) PCT No.: PCT/EP2015/050794
§ 371 (c)(1),
(2) Date: Jul. 14, 2016

(87) PCT Pub. No.: WO2015/107158
PCT Pub. Date: Jul. 23, 2015

(65) Prior Publication Data
US 2016/0333846 A1    Nov. 17, 2016

(30) Foreign Application Priority Data

Jan. 20, 2014 (GB) .................................. 1400906.2

(51) Int. Cl.
*F03B 13/20* (2006.01)
*F03B 13/16* (2006.01)
*F03B 13/18* (2006.01)
(52) U.S. Cl.
CPC ........ *F03B 13/181* (2013.01); *F03B 13/1845* (2013.01); *F03B 13/1885* (2013.01);
(Continued)

(58) Field of Classification Search
CPC ..................... F03B 13/12–13/24; Y02E 10/38
(Continued)

(56) References Cited

U.S. PATENT DOCUMENTS 3,696,251 A * 10/1972 Last .................... F03B 13/1855
290/53
4,134,023 A * 1/1979 Salter .................... F03B 13/181
290/42
(Continued)

FOREIGN PATENT DOCUMENTS

EP           1983190 A1    10/2008

OTHER PUBLICATIONS

J. Hals, "Modelling and phase control of wave-energy converters" Ph.D Thesis, NTNU, 2010:23 ISSN 1503-8181, ISBN 978-82-471-2003-3 (printed version).
(Continued)

*Primary Examiner* — Laert Dounis
(74) *Attorney, Agent, or Firm* — Eversheds Sutherland (US) LLP (57) ABSTRACT

A wave energy convertor for extracting energy from ocean waves. The wave energy convertor may include a buoy arranged to oscillate relative to a reference point about an equilibrium position and a negative spring device connected between the buoy and the reference point, wherein the negative spring device is for applying a positive force in the direction of displacement when the buoy moves away from the equilibrium position.

18 Claims, 5 Drawing Sheets

(52) U.S. Cl.
CPC .......... *F03B 13/1895* (2013.01); *F03B 13/20* (2013.01); *F05B 2260/502* (2013.01); *Y02E 10/38* (2013.01)

(58) Field of Classification Search
USPC ................................ 60/495–507; 290/42, 53
See application file for complete search history.

(56) References Cited

U.S. PATENT DOCUMENTS

| | | | |
|---|---|---|---|
| 4,332,571 A * | 6/1982 | Jakobsen | B63H 1/36 |
| | | | 440/9 |
| 4,371,347 A * | 2/1983 | Jakobsen | B63H 1/36 |
| | | | 440/13 |
| 4,722,517 A | 2/1988 | Dijkstra et al. | |
| 8,629,572 B1 * | 1/2014 | Phillips | F03B 13/16 |
| | | | 290/42 |
| 2007/0126239 A1 * | 6/2007 | Stewart | F03B 13/20 |
| | | | 290/53 |
| 2007/0257491 A1 * | 11/2007 | Kornbluh | F03B 13/1845 |
| | | | 290/53 |
| 2007/0261404 A1 | 11/2007 | Stewart et al. | |
| 2010/0101474 A1 * | 4/2010 | McEvoy | F03B 13/18 |
| | | | 114/230.24 |
| 2012/0153624 A1 * | 6/2012 | Sampaio | F03B 13/16 |
| | | | 290/53 |
| 2012/0247098 A1 | 10/2012 | Stewart | |
| 2012/0248775 A1 * | 10/2012 | Stewart | F03B 11/00 |
| | | | 290/53 |
| 2014/0007567 A1 * | 1/2014 | Stewart | F03B 13/00 |
| | | | 60/495 |
| 2014/0239643 A1 * | 8/2014 | Orlando | F03B 13/20 |
| | | | 290/53 |
| 2015/0152836 A1 * | 6/2015 | Stansby | F03B 13/20 |
| | | | 60/497 |

OTHER PUBLICATIONS

A. Babarit, J. Hals, M.J. Muliawan, A. Kurniawan, T. Moan, J. Krokstad; "Numerical benchmarking study of a selection of Wave Energy Converters", Renewal Energy, vol. 41, No. 0, pp. 44-63, Sep. 1, 2011.

* cited by examiner

WAVE ENERGY CONVERTER WITH NEGATIVE SPRING

TECHNICAL FIELD

The invention relates to a wave energy convertor for extracting energy from ocean waves, and a method of extracting energy from ocean waves. The extracted energy may for example be used to generate electrical power.

BACKGROUND OF THE INVENTION

Energy is transported by ocean waves. In the pursuit of energy sources having a low carbon footprint, there has been much work in the conversion of the energy of ocean waves into useful forms of energy, such as electricity. One field of such work is focused on so-called point absorbers. Point absorbers are effectively individual buoys floating on the surface of the ocean which undergo displacements due to incident ocean waves. This displacement can be used to convert wave energy into useful forms of energy. An example of such a point absorber is given in WO 99/22137.

Further, it is known in the field of wave energy conversion to use pre-tensioned buoys. Pre-tensioning of a buoy (e.g. by in some way forcing it to submerge to a depth greater than its natural floating depth) has the effect of providing a negative mass to the oscillating system, and hence effectively reducing the inertia of the buoy, and increasing its response to incident waves.

SUMMARY OF THE INVENTION

Viewed from a first aspect, the present invention provides a wave energy convertor for extracting energy from ocean waves comprising: a buoy arranged to oscillate relative to a reference point about an equilibrium position; and a negative spring device connected between the buoy and the reference point, wherein the negative spring device is for applying a positive force in the direction of displacement when the buoy moves away from the equilibrium position.

By using a negative spring it is possible to increase the range of movement of the buoy because the negative spring effect will counter the hydrostatic stiffness of the buoy and the buoy's natural resistance to oscillation, for example due to the balance between buoyancy and gravity. With the use of a negative spring a buoy may be made to have an apparent stiffness that is very low for a given range of movement, which means that it can be designed to oscillate with a larger amplitude of movement than prior art buoys when excited by wave motions over larger range of frequencies than would affect prior art buoys (i.e. the bandwidth of wave frequency that will prompt resonant oscillation of the buoy is increased). The result of this is that a buoy with a negative spring as described above can be more easily and more effectively used as a source for energy conversion over a greater range of wave frequencies. It has been found that the use of a negative spring can provide an increase of at least 100% in delivered energy for a heaving buoy system. That is to say, in an experimental comparison of a heaving buoy with a negative spring and a standard heaving buoy (with no negative spring) then the average power output is at least doubled compared to the standard system. A greater range of movement for the buoy can also simplify coupling the buoy to other devices for energy conversion, for example to mechanical or electro-mechanical devices. The present invention may be used for pre-tensioned buoy, or for a non-pre-tensioned buoy. However, using a pre-tensioned buoy may further increase the response of the buoy to incident waves.

The incident ocean waves relevant for wave energy conversion typically have wave periods in the range from 4 s to 14 s, and have wave heights typically of up to 5 m, and in some extreme conditions of up to 10 m or more.

The equilibrium position of the buoy is a position at which there is no restoring force/acceleration experienced by the buoy when oscillating. This is typically the position that the buoy would be at relative to the reference point when there is no wave energy present, i.e. when at rest, and without any effects that may arise from the negative spring device. The buoy may be floating on the surface of the ocean, or may be semi-submerged, or submerged.

The reference point is a point about which the buoy oscillates. The negative spring device is coupled between the buoy and the reference point in that when the buoy moves relative to the reference point then the spring device releases or stores energy. The reference point may be a fixed point. The reference point may be fixed relative to the sea bed, or relative to a structure, for example a structure that undergoes significantly less motion than the buoy. Such a structure may be a pier or a large floating/submerged/semi-submerged structure (i.e. a structure significantly larger than the floating buoy). The structure should not significantly oscillate due to incident wave energy at the same frequency as the buoy such that buoy can oscillate due to incident wave energy relative to the structure. When the fixed point is joined to the sea bed then it can be considered as an absolutely fixed point.

The oscillation may be a linear motion oscillation, or a rotational oscillation, or a combination of the two. The overall motion may be superposition of several translatory and/or oscillatory motions. Similarly, the spring device may include spring elements that release or store energy when there is a linear and/or oscillatory motion. For example, a helical spring, volute spring or gas piston spring can be compressed by linear motion and store energy that is release when they expand. A spiral torsion spring or torsion bar will deform and store energy when subject to a rotational motion.

The negative spring device may be a spring device that is capable of producing a force in a direction of displacement of the buoy when the buoy is displaced from its equilibrium position. The negative spring device may provide no force in a direction of oscillatory motion of the buoy when the buoy is in its equilibrium position. The magnitude of the force provided by the negative spring device in the direction of displacement of the buoy may change as the buoy moves away from its equilibrium position. This change in force may be due to the geometry of the system. This change in force may begin to act when the buoy is displaced from its equilibrium position. The force produced by the negative spring device may act to push the buoy along the direction of displacement of oscillation. By carefully designing the negative spring device it becomes possible to match the forces from the spring with other forces in the system, for example forces due to the buoyancy and gravity of the buoy. In one example arrangement the negative spring may provide a force that initially increases with displacement when the buoy moves away from the equilibrium position.

The negative spring device may provide such a force by being in a state of compression when the buoy is at its equilibrium position and by being allowed to expand when the buoy is displaced from the equilibrium position. The negative spring may be in a state of maximum compression when the buoy is at its equilibrium position, for example for a linear spring the distance between the reference point and the point at which the negative spring connects to the buoy may be at a minimum when the buoy is in its equilibrium position. The negative spring device may act by pushing the buoy relative to the fixed point as the buoy is displaced from its equilibrium position.

The negative spring device may be configured to provide a negative stiffness that acts against the hydrostatic stiffness of the buoy. The negative spring device may produce a total stiffness around the equilibrium point that is less than the hydrostatic stiffness (without the negative spring). The hydrostatic stiffness may typically be reduced by a factor of about 5, or more, depending on other properties of the buoy system. The hydrostatic stiffness may be reduced by a factor of 10 or more. The stiffness may be reduced in this way for a given range of movement around the equilibrium point. For a linear motion oscillator, the stiffness may be substantially reduced for displacements of around ±1 to 5 m. The stiffness may be reduced through the available stroke of the buoy. For a rotary oscillator, the stiffness may typically be substantially reduced for displacements of around ±0.1 to 0.5 rad. For displacements not around the equilibrium point, the stiffness of the system may be allowed to increase.

The reduction in stiffness around the equilibrium point leads to a greatly reduced overall restoring force being present. The reduction in stiffness leads to an increased bandwidth of the oscillating buoy, which leads to greater amplitudes of oscillation of the buoy for a greater range of incident waves frequencies. This increases the efficiency of the wave energy convertor since it allows more wave energy to be converted over a wider range of wave frequency.

The hydrostatic stiffness S is the coefficient (or constant) of proportionality between the restoring force experienced by the buoy and the displacement of the buoy from its equilibrium point. It is a concept relevant only to the oscillation of a semi-submerged system with considerable heave motion and any system rotating about an axis close to the mean ocean surface level. Hydrostatic stiffness is an analogue of the spring constant k in a standard mass/spring mechanical oscillator. For a linear motion oscillator, the hydrostatic stiffness S is approximately related to the restoring force by the relationship $S=F/z$, where F is the restoring force and z is the displacement from equilibrium. For a rotary oscillator, the hydrostatic stiffness is approximately related to the restoring force by the relationship $S=\tau/\theta$, where $\tau$ is the restoring torque and $\theta$ is the angular displacement from equilibrium. Thus, reducing the hydrostatic stiffness may be thought of similarly to reducing the restoring force or torque (from now jointly referred to as "restoring force") experienced by the buoy. As the buoy is displaced from its equilibrium position, the total force from the negative spring device may decrease. At a certain displacement, the total force from the negative spring device (and hence the component of the force in the direction of displacement of the buoy) may be zero. This displacement is referred to herein as the threshold displacement. At displacements larger than the threshold displacement, the negative spring device may provide a force in a direction opposite to the direction of displacement of the buoy from its equilibrium position. In such a case, the negative spring device acts as a positive spring after a certain displacement.

Such positive spring capabilities can help to avoid or reduce the reliance upon the use of end-stops. End-stops are typically required to limit the maximum displacement of the buoy away from its equilibrium point. The conversion from a negative to a positive spring may act as an end stop, meaning that additional end stop components are not required. Alternatively the positive spring effect can mean that a weaker end stop can be used. The positive spring capability can therefore reduce the number of components present in the system and reduce wear in the system, as the buoy is no longer required to strike an end-stop to limit its displacement, or strikes the end-stop with less force.

The total force provided by the spring device may initially increase as displacement increases then it may decrease before becoming positive at the threshold displacement. The component of the force from the spring device in the direction opposite to the direction of displacement of the buoy may further be increased due to the geometry of the system, and since, beyond the threshold displacement, the total force produced by the negative spring device may increase as it is extended.

As the buoy moves beyond the threshold displacement, and the negative spring device starts to act with a positive total force, the wave energy convertor may store energy. This energy may be considered to be potential energy stored in the wave energy convertor, arising from converting the kinetic energy of the buoy and/or the hydrostatic potential energy of the buoy. The energy may be stored in the negative spring device. The stored energy may be later used. The energy may be stored in one or more fluid, e.g. gas or liquid, accumulators. Pressurised fluid may be stored in the accumulator, the fluid having been pressurised using the kinetic and/or hydrostatic energy of the buoy. The accumulator may be in addition to the negative spring device, and may be connected to the negative spring device. However, in the case that the negative spring device comprises a hydraulic/pneumatic/gas spring (see below), the accumulator may form part of the negative spring device, i.e. the accumulator may directly contribute to the spring characteristics of the negative spring device. In this case, an additional accumulator may also be provided to increase the energy storage capacity.

The negative spring device may be connected between the buoy and the reference point by any suitable coupling. This coupling may allow for hinged rotation of the negative spring device relative to the buoy and the reference point during the oscillating movement of the buoy. The coupling may be of any of the forms known in the art suitable for such a purpose. During operation of wave energy converter, the negative spring device has a maximum rotation about the reference point of between −90° and +90°, relative to the position of the spring device at equilibrium. Preferably this interval is between −70° and +70°, −50° and +50° or −30° and +30°.

The negative spring device may comprise a mechanical spring. The negative spring device may comprise a plurality of mechanical springs. The mechanical spring may be a coil spring, a gas/pneumatic spring or a hydraulic spring. A gas/pneumatic or hydraulic spring may be particularly effective for producing negative spring effects. The mechanical spring may preferably comprise a hydraulic cylinder/ram and a gas accumulator. In this case, larger pressure ranges may be handled by the negative spring device.

A gas/pneumatic or hydraulic spring may comprise a fluid cylinder.

The negative spring device may comprise controlled or passive valves. The valves may be used to adjust and/or regulate the pressure in hydraulic/pneumatic/gas springs. It may therefore be possible to alter, tailor and/or optimise the operation of the negative spring device. For instance, it may be possible to alter, tailor and/or optimise the negative spring force/torque provided by the negative spring device; the optional threshold displacement; and/or the optional positive spring force/torque provided by the negative spring device.

The valves may be solenoid valves, hydraulic valves, gas-driven valves or pneumatic valves. The valves may be controlled by a controller. Measurements may be taken, or estimates produced, of the state of the wave energy convertor and/or the state of the water surrounding the wave energy convertor. The measurements/estimates may be of the instantaneous state of the wave energy convertor and/or surrounding water. For example, the measurements/estimates could be one or more of the motion of the buoy, power take off dynamic variables and/or wave dynamic variables. The measurements/estimates may be used by the controller to control the valves.

In an embodiment, the reference point may be provided on a support member fixed relative to the sea bed or the structure, the buoy being configured to oscillate relative to the support member, the spring device being coupled between an interior of the buoy and the support member.

The support member may be a rigid support member (e.g. a rod or pole). The support member may be attached to the sea bed or the structure.

The support member may be a flexible support member (e.g. a cable or flexible tube). The support member may be kept under tension, for example, between the sea bed and the structure.

The buoy may be configured to undergo translational/linear motion oscillation. When the buoy is displaced from its equilibrium position, the force from the negative spring device may have a component in the direction of the linear displacement. The reference point may be at an equilibrium position of the oscillating buoy.

Alternatively or additionally, the buoy may be configured to undergo rotational oscillation. The buoy may oscillate with an angular displacement about a pivot point. The pivot point may be external to the buoy. The buoy may be connected to the pivot point via a connecting member. The connecting member may be rigid and may connect to the centre of the buoy. The negative spring device may be coupled between the centre of the buoy and the reference point. The nearer the reference point is to equilibrium position of the buoy, the greater the tangential force provided by the spring will be. Alternatively a torsion spring device may be used as the negative spring device. When the buoy is displaced from its equilibrium position, the force from the negative spring device has a component in the tangential direction of the oscillating buoy.

The reference point may be at, or close to, any position along the line connecting the equilibrium position and the pivot point, and preferably at a position between the equilibrium position and the pivot point, further preferably at a position between the centre of the buoy when at its equilibrium position and the pivot point. The reference point may be at a position fixed relative to the pivot point.

The wave energy converter may comprise multiple negative spring devices. For example, when the buoy is configured to undergo linear motion then there may be spring devices extending along radial directions from an axis defined by the direction of translational movement and being spaced apart around the axis. When the buoy is configured to undergo rotational oscillation motion then there may be multiple spring devices that, at the equilibrium point, extend along a plane that is normal to a tangent to the arc of movement of the buoy. Thus, in each case, the multiple negative spring devices may be arranged to extend in different directions along a plane perpendicular to the direction of movement at the equilibrium position. Preferably the multiple spring devices are symmetrically arranged. Preferably all of the spring devices are connected between the buoy and the same reference point.

When multiple gas, pneumatic or hydraulic springs are used, at least two of the multiple spring devices may be fluidly connected to one another such that the pressure of fluid in the respective negative spring devices remains equal. Such a fluid connection may prevent uneven loads between the buoy and the reference point. The fluid connection may be permanent. The fluid connection may selectively connect the at least two multiple spring devices, e.g. by way of a valve. The fluid connection may comprise a means for selectively connecting the at least two multiple spring devices, e.g. a valve. The fluid connection may comprise a pipe or hose connection, and may further comprise a valve. The fluid connection may be between the cylinders of the springs.

For a linear system the negative spring devices may be arrayed in a star formation about the axis along the direction of movement, for example a two, three or five pointed star. When there is a symmetrical arrangement of this type then advantageously there may be no net force between the buoy and the support member due to the negative spring devices in directions perpendicular to the direction of the support member. This can be achieved using symmetrically spaced negative springs with identical characteristics. In this case, all forces from the springs will be along the direction of movement, which may be the direction of the support member. For example, three spring devices separated by 120° may be present, all providing substantially equal forces between the buoy and the support member.

The support member may pass through the centre of the buoy. The support member may be oriented in a direction of oscillation due to the buoyancy of the buoy, which may be the direction of translational movement referenced above. This direction may be substantially vertical.

Each negative spring device may comprise only one spring. This is the simplest arrangement and could for example be provided by a single spring that is in compression and perpendicular to the direction of translational movement, or to a tangent to the arc of rotational movement, at the equilibrium position.

Alternatively, the, the one or more, or each negative spring device may comprise a set of springs, for example a V-shaped pair of angled springs that, at the equilibrium position, are symmetrically arranged about a perpendicular to the direction of motion at the equilibrium position, this direction being, for example, a direction of translational motion or a tangent to an arc of rotational movement. The springs of each negative spring device may lie in the same plane as both the perpendicular and the direction of motion. In this case, the set of springs may extend from a connection to the reference point (at the tip of the V) to respective points on an interior surface of the buoy (at the two ends of the V). The respective points may be separated in a direction substantially aligned with the direction of movement. During movement away from the equilibrium position the spring (or set of springs) will provide a force with a component along the direction of movement, hence resulting in the addition of negative stiffness. It will be understood that the angle of the spring device away from the perpendicular will increase during the movement, meaning that the force's component along the direction of movement will increase since the force becomes more aligned with the direction of movement.

When gas, pneumatic or hydraulic springs are used, at least two springs of the set of springs may be fluidly connected to one another such that the pressure of fluid in the respective springs of the set of springs remains equal. Such a fluid connection may reduce friction in the system. The fluid connection may be permanent. The fluid connection may selectively connect the at least two springs, e.g. by way of a valve. The fluid connection may comprise a means for selectively connecting the at least two springs, e.g. a valve. The fluid connection may comprise a pipe or hose connection, and may further comprise a valve. The fluid connection may be between the cylinders of the springs.

Examples of the springs used may be those manufactured by The Sheffer Corporation of Cincinnati, Ohio, USA, Parker Hydraulics of Norwich, England, and Bosch Rexroth of Charlotte, N.C., USA. For pneumatic springs, the maximum pressure which they are designed to withstand may be up to about 100 bar, preferably up to 150 bar, and the cylindrical bore may be between 10 cm and 100 cm. The maximum pressure the pneumatic spring may withstand may be up to about 10 bar, preferably up to 15 bar, and further preferably up to 20 bar, and the cylindrical bore may be between 30 cm and 100 cm. For hydraulic springs, the maximum pressure which they are designed to withstand may be up to 200 bar, and the cylindrical bore may be about 50 cm.

In the present invention, the buoy may have any known shape. For example, it may be generally cylindrical or spherical in shape.

The wave energy convertor may be used as a pump or as an electrical energy generator. When acting as a pump, the oscillating buoy may drive a hydraulic system or a pneumatic system in order to harness energy. The hydraulic or pneumatic system may subsequently be connected to an electrical generator. Alternatively, the oscillating buoy may directly generate electricity via an electro-mechanical arrangement incorporating the required magnets and circuitry as is known in the art. Such an electro-mechanical arrangement may be a part of the buoy or the buoy may be mechanically coupled to an external device.

In another aspect, the invention provides a method of extracting energy from ocean waves comprising: allowing a buoy to oscillate, due to wave motion, about an equilibrium position relative to a reference point; and using a negative spring device, providing a positive force between the buoy and the reference point when the buoy moves away from the equilibrium position, the positive force being in the direction of displacement between the buoy and the equilibrium position.

In yet another aspect the invention provides a method of extracting energy from ocean waves comprising: allowing a buoy to oscillate, due to wave motion, about an equilibrium position relative to a reference point; and providing a positive force between the buoy and the reference point, the positive force being in the direction of displacement between the buoy and the equilibrium position.

The method(s) may include providing a positive force between the buoy and the reference point in the direction opposite to the direction of displacement between the buoy and its equilibrium position, if the displacement is greater than a threshold.

The forces between the buoy and the reference point may be provided by a negative spring device as described above. The method may include using an apparatus with any or all of the features described above. The oscillation may be linear motion oscillation, or rotational oscillation, or a combination of the two.

The negative spring device used in the method(s) may be the negative spring device as described above in relation to the first aspect of the invention.

In a fourth aspect the invention provides a wave energy converter for use in the previously described method, the wave energy converter comprising a buoy connected to a reference point by a negative spring device. This wave energy converter may comprise any or all of the features described above in connection with the first aspect of the invention.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

Certain preferred embodiments will now be described by way of example only and with reference to the accompanying drawings, in which.

DETAILED DESCRIPTION

A wave energy converter is a dynamic system that absorbs energy from ocean waves by radiating a wave that creates destructive interference with the incident waves. The system may be characterised by its dynamic response, which has a certain bandwidth. This means that it has a range of frequencies over which it responds well to the excitation from incident waves. Outside this range the response is weaker, in the sense that it is not able to significantly absorb energy from the incident wave. Typically, the response bandwidth is narrower than the bandwidth of naturally occurring ocean waves. This is especially true for small systems, so-called point absorbers, such as buoys.

Together with ensuring reliability and durability, achieving a sufficient bandwidth for the power absorption is a paramount challenge for the development of wave energy converters.

Bandwidth may also be thought of in terms of the velocity response of a system to an excitation force. The relation between excitation force and response velocity is crucial for the absorption of wave energy. At zero phase difference between response and excitation, the excitation power is a maximum. For maximum absorption the velocity amplitude must be at an optimum ratio with the incident wave amplitude. The preferred embodiments seek to make the phase difference zero or close to zero.

Figure 1:
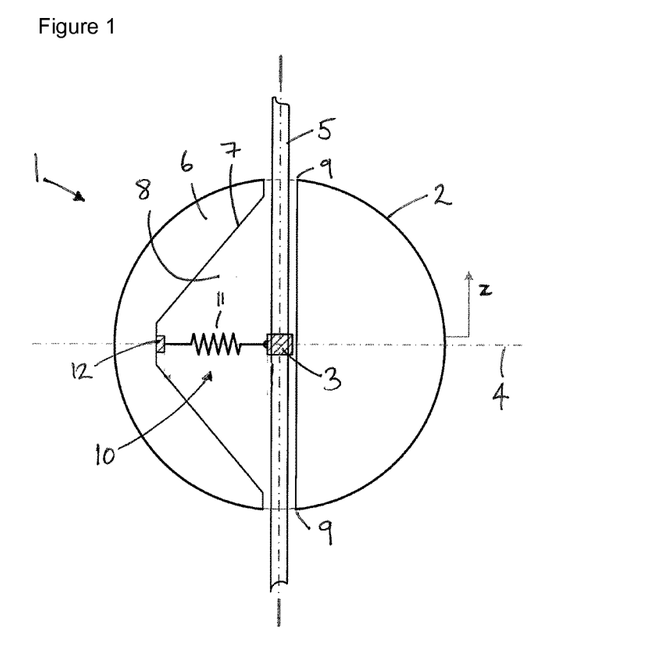
FIGS. 1, 4 and 7 show different embodiments of a wave energy converter according to the present invention.

FIG. 1 shows an exemplary embodiment of the wave energy convertor 1 of the present invention. The wave energy convertor 1 includes a buoy 2 that may oscillate relative to a reference point 3 about an equilibrium position 4. The wave energy convertor further includes a negative spring device 10 connected between the buoy 2 and the reference point 3. The negative spring device 10 applies a positive force in the direction of displacement (z) when the buoy moves away from the equilibrium position 4. In the embodiment of FIG. 1, the direction of displacement (z) is the vertical direction.

In the embodiment of FIG. 1, the buoy 2 is spherical and comprises a sealed air-filled shell 6 which is generally in the shape of a spherical shell. The shell 6 provides the buoy 2 with buoyancy. The interior surface 7 of the shell 6 defines a hollow interior cavity 8. The cavity 8 may also provide the buoy 2 with buoyancy. The buoy 2 may have a radius of around 4 m, though other radii are possible.

A support member 5 (e.g. a rod, a pole, a cable) passes through opposing holes 9 in the shell 6 and through the centre of the buoy 2, and is oriented generally in the direction of the displacement (z) of the buoy 2. The reference point 3 is fixed to the support member 5 and is positioned at the centre of the buoy 2.

The negative spring device 10 comprises a mechanical helical spring 11 and is fixed between the reference point 3 and the interior surface 7 of the shell 6 such that, when the buoy 2 is in its equilibrium position 4, the negative spring device 10 is perpendicular to the support member 5 and displacement direction (z). The negative spring device 10 is in a state of maximum compression when the buoy 2 is at its equilibrium position. Connections 12 and 13 allow for hinged rotation of the negative spring device 10 relative to the interior surface 7 and the reference point 3.

Although not shown in FIG. 1, the wave energy converter 1 comprises multiple negative spring devices 10, the spring devices 10 extending between the reference point 3 and the interior surface 7 as described above, and having substantially identical mechanical properties. The multiple negative spring devices 10 are symmetrically spaced apart around the axis of the support member 5. Thus, the negative spring devices 10 are arrayed in a star formation about the axis of the support member 5, for example a two, three or five pointed star. For example, three negative spring devices 10 separated by 120° may be present, all providing substantially equal forces between the buoy 2 and the support member 5.

It is clear that the buoy 2 of the FIG. 1 embodiment may undergo translational/linear motion oscillation due to incident wave energy. When the buoy 2 is displaced from its equilibrium position 4, the force from the negative spring device 10 has a component in the direction of the linear displacement (z). Thus, when the buoy 2 moves away from its equilibrium position, the negative spring device 10 releases its stored energy.

The magnitude of the force provided by the negative spring device 10 in the direction of displacement (z) of the buoy 2 changes as the buoy 2 moves away from its equilibrium position 4. This change in force is in part due to the geometry of the system, since the component in the z-direction of the total force applied by the negative spring device 10 increases relative to the component perpendicular to the z-direction as the displacement of the buoy 2 increases away from the equilibrium position 4. Further, the force changes since the total force produced by the negative spring device 10 changes as the length of the negative spring device 10 is changed. Thus, this change in force begins to act when the buoy is displaced from its equilibrium position. The force produced by the negative spring device acts to push the buoy along the direction of displacement (z) of oscillation. In one example arrangement the negative spring device 10 may provide a force that initially increases with displacement when the buoy 2 moves away from the equilibrium position 4.

The negative spring device 10 provides a negative stiffness that acts against the hydrostatic stiffness of the buoy 2, and hence reduces the hydrostatic stiffness of the system. However, for displacements (z) not within a threshold displacement around the equilibrium point, the stiffness of the system is allowed to increase. This can be seen in the example shown in FIG. 2 in which the dashed line is the hydrostatic stiffness force (F(z)) of the buoy 2 and the solid line is the force due to the negative spring device 10 (F(z)), as a function of displacement (z) from equilibrium 4.

Figure 2:
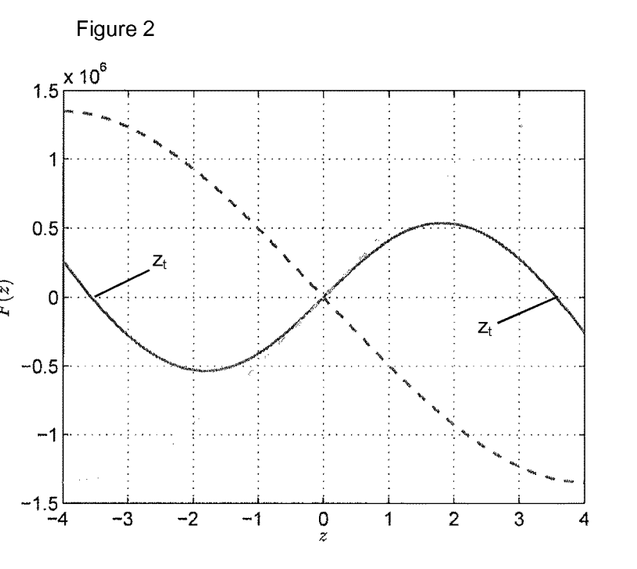
FIGS. 2, 3, 5, 6, 8 and 9 are graphs showing various forces/torques as a function of displacement of the wave energy converters of FIGS. 1, 4 and 7.
Figure 3:
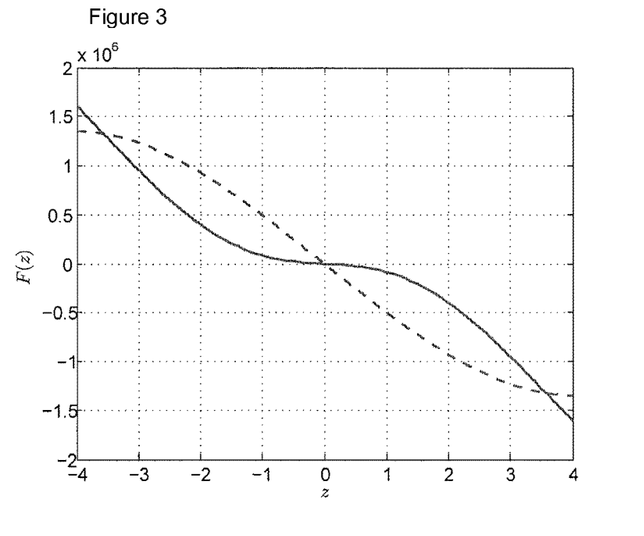

The resultant stiffness force of the system is shown by the solid line in FIG. 3 (again the dashed line is the hydrostatic stiffness force of the buoy 2). As can be seen, there is a reduction in stiffness around the equilibrium point. It should be noted that the precise values shown on the axes of FIGS. 2 and 3—and FIGS. 5, 6, 8 and 9—are just by way of illustrative example. Greater or smaller displacements and forces may be encountered. These values depend on numerous factors including the energy of incident waves and the size of buoy.

As the buoy 2 is displaced from its equilibrium position 4 the total force from the negative spring device decreases. At a threshold displacement (marked as $z_t$ in FIG. 2), the total force (and hence the component of the force in the direction of displacement of the buoy) is zero. As can be seen from FIG. 2, at displacements larger than the threshold displacement ($z_t$), the negative spring device 10 provides a force in a direction opposite to the direction of displacement (z) of the buoy 2 from its equilibrium position 4. Thus, the negative spring device 10 acts as a positive spring device after a certain displacement ($z_t$), and increases the total stiffness of the system.

With reference to FIG. 2, the total force provided by the negative spring device 10 initially increases as displacement (z) increases then it decreases before becoming a positive spring (and hence applying a force that is opposed to the direction of displacement) at the threshold displacement ($z_t$). The component of the force from the spring device in the direction opposite to the direction of displacement of the buoy may further be increased due to the geometry of the system (for similar reasons as those discussed above) and since, beyond the threshold displacement ($z_t$), the total force produced by the spring device may increase as it is extended. The positive spring effect at large displacements can be used as part of an "end stop" system to limit the maximum displacement of the buoy.

Figure 4:
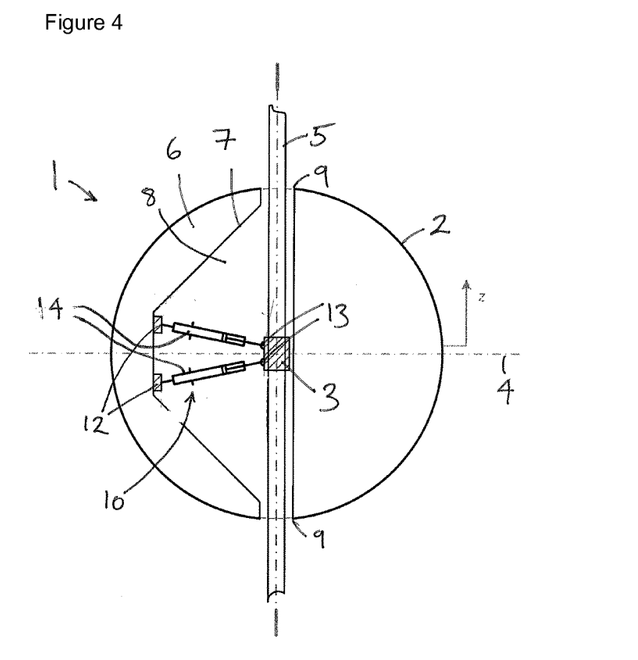

Referring to FIG. 4, this shows a wave energy converter largely similar to that shown in FIG. 1. However, in this embodiment, each negative spring device 10 may comprise a set of springs 14 comprising a V-shaped pair of angled springs that are symmetrically arranged about a plane perpendicular to the direction of translational motion (z). The set of springs 14 may extend from a connection 13 to the fixed point 3 to respective points 12 on the interior surface 7 of the buoy 2. The respective points 12 are separated in a direction substantially aligned with the direction of the support member 5. In this example embodiment, gas springs are shown.

Figure 5:
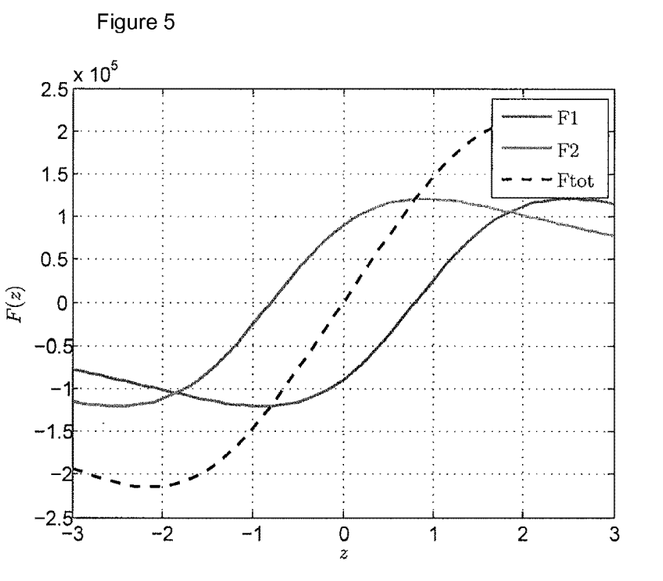
Figure 6:
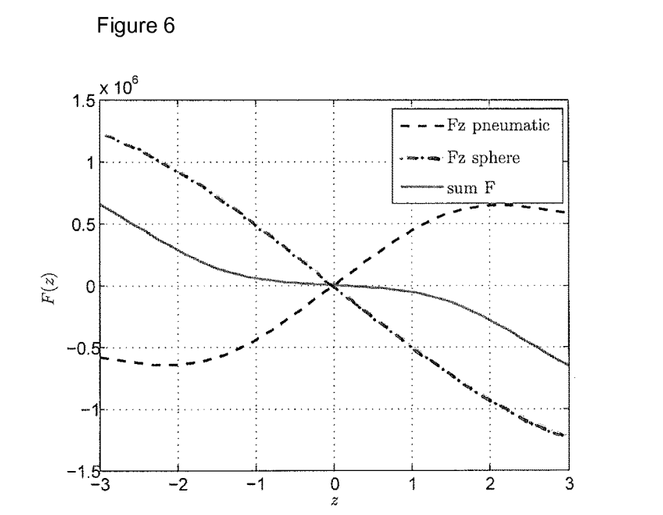

As can be seen from FIG. 5, the use of the set of springs 14 allows for tailoring of the force characteristics of the negative spring device 10. In FIG. 5, the force on the buoy in the z-direction from each spring in the set is shown by F1 and F2 (the solid lines). The resultant force is shown by Ftot (the dashed line). The angle between the springs in each set and the total force (sum F) produced by each spring are chosen such that the resultant force from the negative spring device (Fz pneumatic) best reduces the hydrostatic stiffness of the buoy (Fz sphere) around equilibrium. This is shown in FIG. 6. The angle provides another controllable factor which aids the engineer in producing the most effective stiffness reduction.

Figure 7:
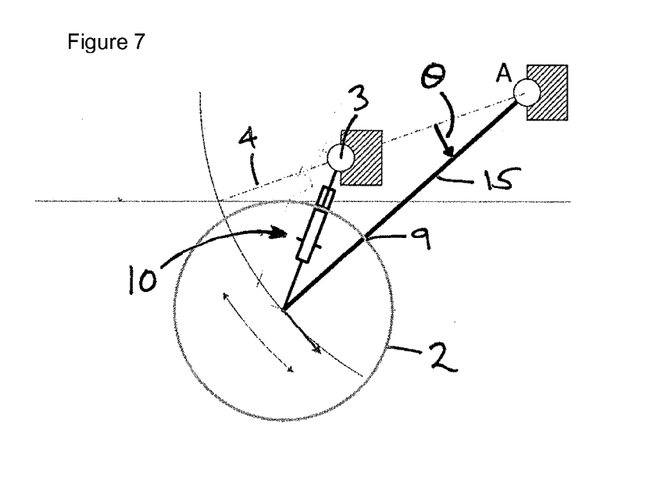
Figure 8:
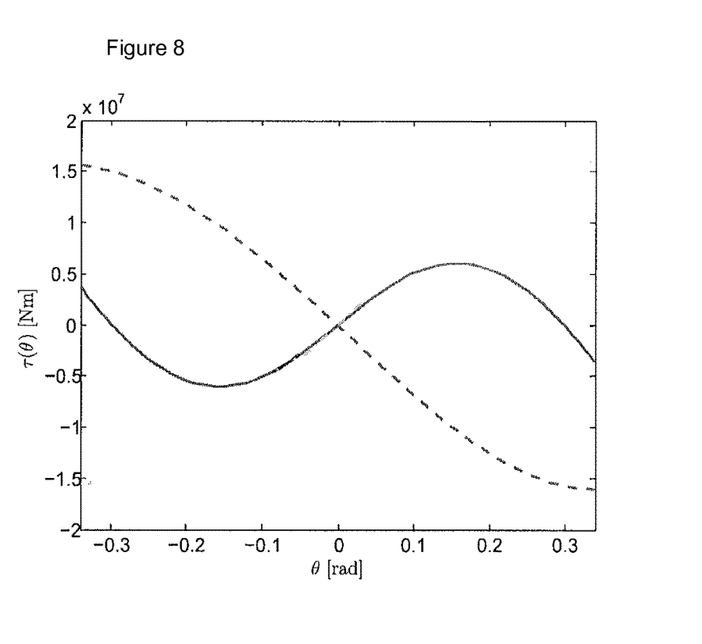
Figure 9:
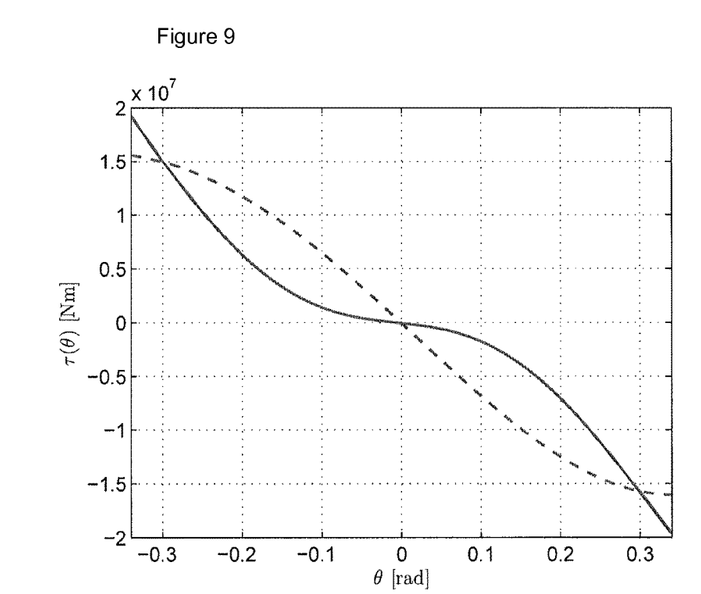

FIG. 7 shows an example embodiment of the present invention in which the buoy 2 undergoes rotational oscillation. The buoy 2 may be substantially similar to that described in relation to the previous embodiments. However, the buoy 2 of the FIG. 8 embodiment comprises only one hole 9 to allow a connecting member 15 to connect the centre of the buoy 2 to the an pivot point (A), and a slot (not shown) through which the negative spring device 10 may extend. The buoy 2 oscillates with an angular displacement about the pivot point (A), the pivot point (A) being external to the buoy 2. The negative spring device 10 may be coupled between the centre of the buoy and the reference point 3. When the buoy 2 is displaced from its equilibrium position, the force from the negative spring device has a component in the tangential direction of the oscillating buoy.

The reference point 3 is located along the line which extends from the pivot point (A) at the equilibrium angle of buoy. Further, it is located between the centre of the buoy 2 when at its equilibrium position 4 and the pivot point (A).

The negative spring assembly 10 of the wave energy converter 1 of FIG. 7 acts similarly to the negative spring assemblies 10 of FIGS. 1 and 4 to reduce the hydrostatic stiffness of the system, and hence to increase the bandwidth of the wave energy converter. The reduction in hydrostatic stiffness can be seen in FIGS. 8 and 9, which show similar effects to FIGS. 2 and 3. Thus, in FIG. 8 the dashed line is the hydrostatic stiffness torque of the buoy 2 ($\tau(\theta)$) and the solid line is the torque due to the negative spring device 10 ($\tau(\theta)$), as a function of angular displacement ($\theta$) from equilibrium 4. The resultant stiffness torque ($\tau(\theta)$) of the system is shown by the solid line in FIG. 9 (again the dashed line is the hydrostatic stiffness torque of the buoy 2). As can be seen, there is a reduction in stiffness around the equilibrium point.

As noted above, the effect of the negative spring is to greatly enhance the energy that can be delivered by the system. For a linear oscillation type buoy of the type shown in FIG. 4 an experimental comparison has been made with a standard buoy design and this found that the increase in energy delivery was at least 100%. The experiment used a conventional resistive loading set up to measure the energy delivery. A significant advantage provided by the wave energy converters described herein is hence an average power output that is at least doubled compared to known designs.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A wave energy convertor for extracting energy from ocean waves comprising: a buoy arranged to oscillate relative to a reference point about an equilibrium position; and a negative spring device connected between the buoy and the reference point, wherein the negative spring device is for applying a positive force in the direction of displacement when the buoy moves away from the equilibrium position and wherein the negative spring device includes a plurality of negative springs arranged circumferentially about an axis along the direction of movement and in a plane perpendicular to the direction of movement, with each negative spring applying a positive force in the direction of displacement when the buoy moves away from the equilibrium position.

2. A wave energy convertor as claimed in claim 1, wherein the negative spring device is configured to provide no force in a direction of oscillatory motion of the buoy when the buoy is in its equilibrium position.

3. A wave energy convertor as claimed in claim 1, wherein the negative spring device is configured to provide a force that initially increases with displacement when the buoy moves away from the equilibrium position.

4. A wave energy convertor as claimed in claim 1, wherein the negative spring device acts to counteract the hydrostatic stiffness of the buoy, when the buoy is in use, such that the total stiffness of the buoy at the equilibrium position is reduced compared to the buoy without the negative spring.

5. A wave energy convertor as claimed in claim 1, wherein the negative spring device acts to counteract the hydrostatic stiffness of the buoy, in use, in order to thereby increase the bandwidth of resonant oscillation of the buoy.

6. A wave energy convertor as claimed in claim 1, wherein at displacements larger than a threshold displacement, the negative spring device is configured to provide a force having a component in a direction opposite to the direction of displacement of the buoy from its equilibrium position.

7. A wave energy convertor as claimed in claim 1, wherein the negative spring device comprises a mechanical spring.

8. A wave energy convertor as claimed in claim 7, wherein the mechanical spring is a coil spring or a gas spring.

9. A wave energy convertor as claimed in claim 1, wherein the negative spring device comprises a set of springs, and wherein the set of springs comprises a V-shaped pair of angled springs that, at the equilibrium position, are symmetrically arranged about a perpendicular to the direction of motion and lie in the same plane as the direction of motion and the perpendicular thereto.

10. A wave energy convertor as claimed in claim 1, wherein the reference point is provided on a support member, the buoy being configured to oscillate relative to the support member.

11. A wave energy convertor as claimed in claim 10, wherein the buoy is configured to undergo translational/linear motion oscillation.

12. A wave energy convertor as claimed in claim 10, wherein the buoy is configured to undergo rotational oscillation with an angular displacement about a pivot point external to the buoy.

13. A wave energy convertor as claimed in claim 10, wherein the negative spring device is coupled between the centre of the buoy and the reference point.

14. A wave energy convertor as claimed in claim 12, wherein the reference point is at, or close to, any position along the line connecting the equilibrium position and the pivot point.

15. A method of extracting energy from ocean waves comprising: allowing a buoy to oscillate, due to wave motion, about an equilibrium position relative to a reference point; and using a negative spring device, providing a positive force between the buoy and the reference point when the buoy moves away from the equilibrium position, the positive force being in the direction of displacement between the buoy and the equilibrium position and wherein the negative spring device includes a plurality of negative springs arranged circumferentially about an axis along the direction of movement and in a plane perpendicular to the direction of movement, with each negative spring applying a positive force in the direction of displacement when the buoy moves away from the equilibrium position.

16. A method as claimed in claim 15, comprising, when the displacement is greater than a threshold displacement, providing a positive force between the buoy and the reference point in the direction opposite to the direction of displacement between the buoy and its equilibrium position.

17. A method as claimed in claim 15, wherein the negative spring device is used to counteract the hydrostatic stiffness of the buoy such that the total stiffness of the buoy at the equilibrium position is reduced compared to the buoy without the negative spring.

18. A method as claimed in claim 15, wherein the negative spring device is used to counteract the hydrostatic stiffness of the buoy in order to thereby increase the bandwidth of resonant oscillation of the buoy.

* * * * *